United States Patent
Blake et al.

[15] 3,673,135
[45] June 27, 1972

[54] PRINTING INK

[72] Inventors: Carl B. Blake, Bronx; George K. L. Tung, Richmond, both of N.Y.

[73] Assignee: Frye Industries Inc., New York, N.Y.

[22] Filed: Oct. 6, 1969

[21] Appl. No.: 871,118

Related U.S. Application Data

[62] Division of Ser. No. 583,688, Oct. 3, 1966, Pat. No. 3,510,340.

[52] U.S. Cl. ................................260/17 A, 106/26, 106/31, 106/180, 260/28.5 R, 260/28.5 D
[51] Int. Cl. .................C08b 21/08, C08f 39/48, C09d 11/14
[58] Field of Search .....................106/26, 31, 180; 260/28.5, 260/17 A

[56] References Cited

UNITED STATES PATENTS 2,002,537    5/1935    Kelly..........................................106/26
3,515,590    6/1970    Lazzarini et al. .........................106/26

OTHER PUBLICATIONS

Chemical Abstracts, Volume 64:19986

*Primary Examiner*—Morris Liebman
*Assistant Examiner*—S. L. Fox
*Attorney*—John A. Crowley, Jr., Francis J. Mulligan, Jr., Robert E. Isner, Peter J. Franco and Spencer T. Smith

[57] ABSTRACT

A printing ink instantaneously hardenable upon contact with a catalyst comprising 65 to 80 weight percent of a varnish having a major amount of a liquid monomer of acrylic or methacrylic di- or triester and a minor proportion of a resin compatible with the liquid monomer, 10 to 30 weight percent pigment, a tertiary aromatic amine accelerator and 1 to 10 weight percent wax.

3 Claims, 1 Drawing Figure

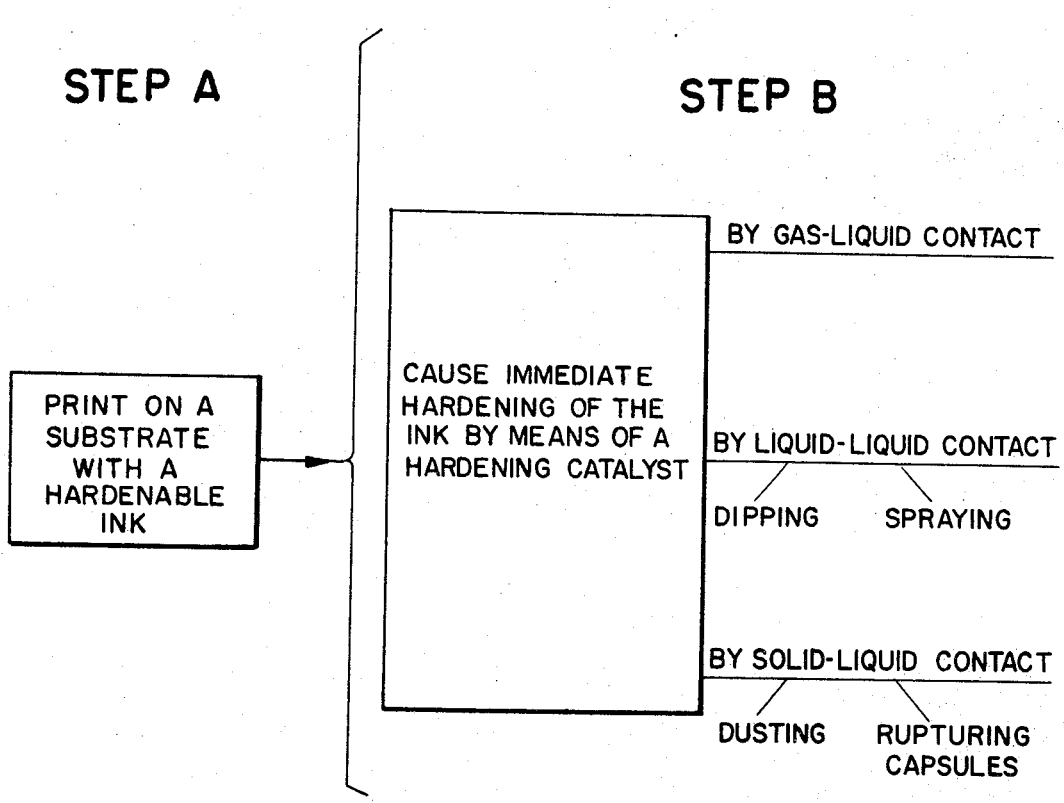

PRINTING INK

This is a division of application Ser. No. 583,688, filed Oct. 3, 1966, now U.S. Pat. No. 3,510,340, granted May 5, 1970.

The present invention is concerned with printing and, more particularly, with printing using inks adapted to dry or harden very rapidly after printing.

The advantages in practical operation which are theoretically obtainable by the provision of an instantaneously drying ink are well-known to those skilled in the printing art. In general, it may be said that the speed of printing is dependent upon the drying characteristics of the ink employed in the process. The faster the ink dries, the faster, within practical limits, the printing machinery can be run and subsequent operations carried out. As a printing operation speeds up, a greater amount of production can be achieved per unit investment and consequent economic efficiencies can be obtained.

At the present time there are three principal types of rapid drying inks which for convenience will be termed "newsprint type inks," "heat set inks," and "moisture set inks." Generally speaking, newsprint type inks comprise a pigment, for example, carbon black, dispersed in a non-volatile oleogenous vehicle which does not "dry" in a physical or chemical sense. Rather the vehicle is absorbed by the medium upon which the print is made. Heat-set inks comprise pigments dispersed in a binder containing relatively large amounts of hard resins and high boiling-point solvents. In use the heat-set ink is printed onto a medium into which it is at least partially absorbed. The printed medium is then exposed to the action of heat or flame which causes the high boiling-point solvents to evaporate and leave a hard, resin-bonded pigmented film. Moisture set inks generally contain a pigment dispersed in a vehicle comprising a resin and a solvent. As produced, the resin is soluble in the solvent and the solvent has the capability of dissolving water. When the resin solvent mixture is substantially anhydrous, a homogeneous, single-phase solution is obtained. However, if the solvent of the mixture is permitted to absorb water, the resin precipitates and a two-phase, solid-liquid system results. In use, the moisture-set ink is printed upon an absorbent medium. Initially, the medium absorbs a portion of the liquid binder. Directly following printing, the printed medium is exposed to a fine spray of water or an atmosphere of steam. Immediately upon this exposure, the resin precipitates forming a solid-phase binder for the pigment. The combination of the actions of precipitation and absorption result in rapid hardening of the printing ink film.

Each of the aforementioned rapid drying types of inks have an area of practical utility which is, at present, being exploited by the printing industry. However, each of the aforementioned types of inks has certain disadvantages. To anyone who has handled a newspaper the principal disadvantage of the newsprint-types of inks is obvious. The ink deposit is easily rubbed from the surface of the paper. In addition, newsprint-type inks are adapted to be printed only on highly absorbent stock, thus limiting the quality of paper which can be used with them.

Heat-set inks have a number of disadvantages. For example, the cost of heaters of sufficient capacity to provide a relatively high temperature in a short period of time is high. If the ink is to be dried rapidly, for example within four seconds after printing, temperatures as high as 180° C. must be used. Such temperatures have a deleterious affect on paper such that a meaningful proportion of the natural strength of the paper is lost and an undesirable artificial aging of the paper occurs. A further disadvantage of heat-set inks lies in the fact that evaporated solvent vapors constitute a fire hazard.

Additional problems have now presented themselves with respect to use of heat-set inks. Currently, heat-set inks are used extensively in high-speed web operations and the vapors resulting therefrom are vented to the atmosphere. The solvent vapors given off by the printing units may be accused of contributing to smog formation. In general, proposed regulations with respect to solvent dispersal into the atmosphere divide organic solvents into two classes, i.e., (a) those which are harmful in themselves and (b) those considered not to be harmful in themselves. Proposed regulations do not apply to the aforementioned (b) group so long as such solvents are used at temperatures of 125° F. or lower. Normal heat-set operations employ inks containing high boiling-point solvents in order to avoid fire and explosion hazards in the press room. As stated before, temperatures as high as 180° C. (356° F.) are needed to assure quick ink setting. In some instances, the printed surfaces are even subjected to flame impingement in order to harden the ink. Accordingly, it is likely that smog control regulations will be applied to printers using large volumes of heat-set inks even though, for the most part, the solvents used in the inks do not in themselves contribute to smog formation.

With respect to moisture-set inks, difficulties have arisen by virtue of the fact that the inks provide little gloss when dry and they are not adaptable to the printing of finely detailed letters or designs. Moisture-set inks are poorly adaptable for printing on relatively non-porous surfaces, such as high gloss paper. The particular chemical nature of the moisture-set systems generally dictates the use of relatively high cost solvents such as glycols. Further, as the initial ink setting takes about 4 minutes, the printing industry has found the average maximum speed of printing is somewhere in the nature of 650 feet per minute. Thus while newsprint inks, heat-set inks, and moisture-set inks have definite areas of utility, they are not, in any sense of the word, a panacea for the need of the printing industry for an instantaneous drying ink, i.e. an ink which will dry to a tack-free surface in a maximum of about 5 seconds after drying is initiated.

It has now been discovered that by means of a special combination of operations a novel process can be provided wherein a freshly printed surface can be hardened within a few seconds to provide an offset-resistant printed sheet without danger of expelling significant quantities of potentially dangerous solvent vapors.

It is an object of the present invention to provide a novel printing process.

A further object of the present invention is to provide a novel process of printing characterized by rapid hardening of a freshly printed surface.

A still further object of the present invention is to provide a means whereby drying of specially formulated printing inks can be accomplished in a matter of seconds.

Another object of the present invention is to provide a novel printing ink.

Other objects and advantages of the present invention will become apparent from the following description taken in conjunction with the drawing in which the FIGURE shows in schematic outline the process of the present invention.

Generally speaking, the present invention contemplates a process for printing which comprises depositing a layer of flowable, induratable printing ink on a substrate which ink exhibits the viscosity and tackiness necessary to assure adhesion to said substrate and contacting said ink with a hardening catalyst, said ink and said catalyst having characteristics such that hardening of the ink occurs substantially instantaneously, that is, within a few, e.g. up to 4, or 5, seconds after contact with the catalyst.

Inks useful in accordance with the present invention are generally characterized by containing a substantial proportion of a monomeric substance or substances capable of polymerizing in the presence of a catalyst and a resin compatible therewith, by being substantially free of permanent solvent and by having rheological properties suitable for use with the type of printing operation which is employed. To be suitable the monomeric substance is ordinarily a liquid at room temperature, has a relatively high boiling point, e.g., in excess of about 185° C. and a low polymerization potential as defined hereinafter. Ordinarily an ink suitable for use in the present process will be free of permanent solvent, that is a solvent which does not react to form a solid or does not evaporate readily from printed surfaces. It is advantageous for the monomer to act as the solvent in the ink and disappear by virtue of polymerization. However, it is possible to include in the ink small amounts of volatile solvents provided such solvents evaporate from the printed ink film under printing conditions, e.g., at a temperature of less than 125° F., within a few seconds after printing. The rheological characteristics required in the ink will depend, for the most part, on the type of equipment used for printing. For example, a suitable gravure ink will have a viscosity of a fraction of a poise and a low yield value of the order of 4 dynes per square centimeter. A suitable letterpress ink used on a cylinder-platen machine could have a viscosity of about 200 to 800 poises and a yield value of the order of about 2,000 dynes per square centimeter. An ink suitable for a sheet-fed rotary offset process might exhibit a viscosity of about 400 to 2,000 poises and a yield value of the order of 10,000 dynes per square centimeter. The layer of ink which is deposited is generally between about 1 to 35 microns thick and, more advantageously, between about 2 and 10 microns in thickness. Since an ink generally contains a dispersed pigment and is very often deposited upon a substrate such as paper which is capable of draining more less of the liquid phase away from the pigment, the actual layer thickness which must be hardened substantially instantaneously is probably not much more than 2 microns thick per printing operation. Of course, it is within the contemplation of the present invention to print more than one layer and to harden the plurality of layers in one hardening operation.

Contact with the catalyst can be accomplished in a number of different ways. The catalyst can be dissolved in a solvent. The solution can then be applied to the printed substrate by spraying or by dipping. When a solvent is used to dissolve the catalyst, care must be taken in selecting the solvent such that it does not deleteriously affect the printed surface. The solvent should also evaporate from the substrate within a few seconds, i.e., less than 5 seconds under conditions of printing, i.e., at a temperature of less than 125° F. to leave the hardened printed film in a substantially solvent-free condition. Alternatively, the catalyst in the form of a powder can be dusted onto the substrate either before or after printing. Advantageously, the catalyst can be encapsulated in micro-capsules. The ink can contain the micro-encapsulated catalyst and, after printing, the micro-capsules can be broken by application of energy such as pressure, infrared exposure (or other form of heat) or ultra-sonic energy or the ink can be exposed to vapors which tend to weaken or disintegrate the capsule walls. It is also possible to precoat the substrate with micro-encapsulated catalyst and to rely on the pressure normally associated with printing to both deposit the ink and rupture the capsules in the printed areas. Further, it is within the contemplation of the present invention to employ a gaseous phase catalyst which is brought into contact with the printed sheet after printing has been completed. The various means by which the process of the present invention can be carried out are illustrated schematically in the drawing. Referring now thereto, the drawing shows the first step of the process (step A) to be printing on a substrate. The printing can consist of a single layer of printing ink or a plurality of layers such as is normally laid down in a multicolor printing operation. The substrate can be paper, cardboard, plastic sheet, cellophane, metal foil, textile or any other substrate with is conventionally printed using ordinary printing machinery. The second step (step B) of the process comprises causing immediate hardening of the ink by means of a hardening catalyst specifically selected to cooperate with the ink to produce a tack-free surface in a maximum of about 5 seconds after contact is made. The catalyst can be a gas, a liquid or a solid which is brought into contact with the liquid ink layer or layers. If the catalyst is soluble in a liquid solvent, contact can be effected by means of dipping or spraying. If the catalyst is a solid, contact can be accomplished by applying the solid as a dust to the printed surface. Set forth on the drawing as a species of solid-liquid contact is the process involving rupturing of capsules. A catalyst enclosed in micro-capsules can be a liquid or a solid and, as mentioned hereinbefore, can be either a constituent of the ink or can be applied separately. The indication of the capsule-rupturing species under solid-liquid contact in the drawing refers primarily to the contact between the liquid ink layer and the interior of capsules having solid-phase walls.

An advantageous, rapidly induratable ink composition in accordance with the present invention comprises a binder containing a high viscosity varnish and a polymerization accelerator which varnish and accelerator mixture is adapted to rapidly react to form a solid when brought into contact with a free radical generating catalyst, e.g., a peroxide-type catalyst. Generally, a pigment and a wax-like additive are incorporated into the varnish-accelerator binder to provide specific printing ink characteristics. Normally, the varnish, the accelerator, the pigment and the wax-like additive are present in amounts within the following ranges (in percent by weight):

| Varnish | 65% to 80% |
| Pigment | 10% to 30% |
| Accelerator | 0.5% to 5% |
| Additive | 1% to 10% |

One of the outstanding novel and advantageous features of the present invention, i.e., the rapid drying (or hardening) character of an ink composition, such as tabulated above, is a function primarily of the binder, i.e., the varnish, taken in association with the accelerator. Essentially the varnish comprises a polymerizable monomer and a resin. The amounts of the respective ingredients are such that the ester is at least equal in weight to the resin and the combination of the two ingredients provides a varnish having the characteristics required for the printing operation contemplated. For example, a varnish suitable for letterpress inks should have a viscosity of about $Z_4$ to $Z_5$ as measured with the Gardner Bubble Viscometer.

An example of a satisfactory varnish in accordance with the present invention in percent by weight is as follows:
  50.5% trimethylolpropane trimethacrylate
  38.0% diethylene glycol diacrylate
  11.5% cellulose acetate butyrate Such a varnish is made by stirring the cellulose acetate butyrate resin into the monomer mixture at room temperature until it is dissolved. Satisfactory results have been attained when one or more of ethylene glycol dimethacrylate, triethylene glycol dimethacrylate, polyethylene glycol dimethacrylate, butylene glycol diacrylate, 1,6 hexamethylene glycol diacrylate, 1,6 hexamethylene glycol dimethacrylate, trimethylolpropane triacrylate, cyclohexylacrylate, propylene glycol monoacrylate or methacryloxy-hydroxy soy oil monomer is or are used in place of the mixed acrylate and methacrylate esters employed in the foregoing example. Likewise, satisfactory results are attained when one or more compatible, monomer-soluble resins such as hard acrylic resin, lacquer resin, chlorinated rubber, ethyl cellulose or a rosin ester is or are used in place of cellulose acetate butyrate resin employed in the foregoing example. In general, the varnish comprises from about 55 to 95 percent by weight of monomer with the balance essentially resin. Advantageously, for good printing characteristics the varnish contains about 75 to 85 percent by weight of monomer. Ordinarily no solvent other than the monomer is present in the varnish.

From the aforementioned illustrative species of monomers and resins useful in manufacturing advantageous printing ink varnishes in accordance with the present invention, certain generalizations can be made. Thus, monomers useful in the varnishes and printing inks of the present invention have an unsaturated carbon-to-carbon linkage in conjugated relationship with a carbonyl group and include acrylic and methacrylic esters having a molecular weight of at least about 150 when the ester molecule contains no free hydroxyl group and a molecular weight of at least about 130 when the ester molecule contains at least one free hydroxyl group. Resins useful in accordance with the present invention are those which are soluble (dispersible) in and compatible with said monomer.

To be useful at all in the process of the present invention, a monomer in the presence of a catalyst must be characterized by exhibiting a polymerization potential (hereinafter defined) of less than about 20 seconds at 25° C. For practical purposes the most highly advantageous monomers have a polymerization potential of less than about 5 seconds at 25° C. In order to be operative for purposes of the present invention, monomers must also have a relatively low vapor pressure, e.g., of the order of about 1 millimeter of mercury (mm/Hg.) at about 20° C. Generally in line with the low vapor pressure, a monomer operative in accordance with the present invention will have a boiling point of at least about 185° C. at 760 mm pressure. Further, monomers useful in accordance with the present invention are compatible with and do not deleteriously affect rubber and other organic materials used in the construction of printing machinery. As a general rule, the requirements of the present invention as to monomers will be satisfied by diesters or triesters of acrylic acid and/or methacrylic acid with glycols, trimethylolpropane, trimethylolethane, pentaerythritol, etherified glycols, glycerol and/or hydroxylated vegetable oils.

For purposes of this specification and the claims appended hereto, the term "polymerization potential" is defined as the time in seconds for a standard quantity of monomer to polymerize under standard catalyzed conditions. In determining the polymerization potential at 25° C., the following procedure was carried out:

A 10-gram sample of monomer was taken to which was added 1.0 gram of a 20 percent by weight solution of 2,4-dichlorobenzoyl peroxide in acetone. The monomer and peroxide were mixed for 30 seconds. Then 0.2 gram of N,N-dimethyl-p-toluidene was mixed into the catalyst-monomer composition. Time for polymerization to occur (the "polymerization potential") was measured from the time of the addition of the tertiary aromatic amine. An illustration of the importance of the actual determination of the polymerization potential and the difficulty in predicting the speed of polymerization of monomers under the conditions prevailing in the present invention is the difference in polymerization potential at 25° C. between cyclohexyl acrylate and cyclohexyl methacrylate. Cyclohexyl acrylate has a polymerization potential at 25° C. of 5 seconds whereas cyclohexyl methacrylate does not polymerize under the aforestated conditions at 25° C. Since it is an object of the present invention to provide printing inks which will be instantaneously hardenable at room temperature, the polymerization potential at room temperature (25° C.) is a highly used tool. However, since low wattage radiant heaters and the like can be used to rapidly raise the surface temperature of paper by a small amount, for example, up to about 50° C. or even 80° C., the polymerization potential at temperatures between room temperature and 80° C. of monomers for use in the compositions of the present invention should be less than about 20 seconds.

In using the inks of the present invention in printing, it is required that after the ink is deposited on the surface being printed, there must be contact between the ink and a free-radical generating catalyst, e.g., a peroxide catalyst. Advantageously, for operation at 25° C. or thereabout, the peroxide catalyst is 2,4 dichlorobenzoyl peroxide or decanoyl peroxide. Other catalysts which may be used include benzoyl peroxide, tertiary dibutyl hydroperoxide, methyl ethyl ketone peroxide and methyl ethyl ketone hydroperoxide. The peroxide catalyst can be applied to the ink deposit either by dipping or by spraying or by other methods disclosed hereinbefore. In the case of either dipping or spraying, it is necessary that the catalyst be dissolved in a solvent which does not disturb the printed matter and which evaporates from the printed substrate substantially immediately at temperatures of less than about 125° F. Excellent results in this regard have been attained with a catalyst solution containing 2.0% by weight of Luperco CDB (a paste of 50% by weight 2,4 dichlorobenzoyl peroxide in dibutyl phthalate), 20% by weight of ethyl acetate and 78% by weight of normal hexane. An even more advantageous catalyst solution comprises, by weight, 2% decanoyl peroxide, 20% ethyl acetate and 78% hexane. It is believed that the peroxide catalyst reacts rapidly with the accelerator in the ink to produce free radicals and thus initiates and propagates the polymerization of the monomer with little or no induction period. Regardless of the theoretical mechanism, it has been found that in order for the present invention to be operative, the ink ordinarily must contain an accelerator, for example, an aromatic, tertiary amine such as N,N-dimethyl-p-toluidene, dimethyl-o-tuluidene and N,N-dimethylaniline in an amount of about 0.8 to 6 percent by weight of the varnish. Less advantageously, an oxidizable metal soap, such as cobalt naphthenate, can be used in relatively large amounts as an accelerator.

In compounding inks useful in the process of the present invention, one can employ as pigments any of the usual pigmentaceous materials common to the printing ink art. Such pigmentaceous materials include pigments such as carbon black, titanium dioxide, chrome yellow, molybdate orange, milori blue, phthalocyanine blue, lithol red, permanent red 2B, extenders such as calcium carbonate, silica, aluminum hydrate, hydrite clay, magnesium carbonate, blanc fixer, toners such as methyl violet, alkali blue, and other materials commonly employed to attain special effects and advantages.

In carrying out the present invention it is advantageous to employ a letterpress ink composition as set forth in Table I.

TABLE I

|  | Weight Percent |
|---|---|
| Monomer | 45–73 |
| Resin | 7–35 |
| Total Varnish | 75–84 |
| Pigment | 11–21 |
| Accelerator | 0.5–3 |
| Wax | 1–2 |

Specific examples of letterpress inks useful in accordance with the present invention are set forth in Table II.

TABLE II

| Example No. | 1 | 2 | 3 | 4 |
|---|---|---|---|---|
| Wt. % Trimethylol propane trimethacrylate | 39.3 | 40.2 | 27.5 | 26.8 |
| Wt. % Diethylene glycol diacrylate | 29.6 | 30.2 | 21.0 | 20.4 |
| Wt. % Cellulose acetate butyrate | 8.9 | 9.1 | 3.3 | 3.2 |
| Wt. % Lacquer Resin* |  |  | 31.6 | 30.8 |
| Wt. % Powdered Polyethylene | 1.5 | 1.5 | 1.6 | 1.6 |
| Wt. % N,N-dimethyl-p-toluidene | 2.0 | 2.0 | 1.1 | 0.6 |
| Wt. % Permanent Red 2B | 18.7 | — |  | 10.4 |
| Wt % Milori Blue | — | 3.0 |  |  |
| Wt % Carbon Black | — | 14.0 | 12.8 |  |
| Wt. % Phthalocyanine Blue | — | — | 1.1 |  |
| Wt. % Aluminum Silicate |  |  |  | 6.2 |
| Wt. % Total | 100.0 | 100.0 | 100.0 | 100.0 |

*Resin sold by Archer-Daniels-Midland under commercial designation Arochem 650

Essentially the letterpress inks are made by preparing a varnish, milling pigments and wax (polyethylene) into a major portion of the varnish, mixing the remainder of the varnish with the amine accelerator and incorporating the mixed accelerator and varnish with the pigmented varnish. In all ink formulations within the ambit of the present invention powdered polyethylene can be replaced in substantially equal amounts by microcrystalline wax, paraffin wax or any one of a number of natural or synthetic waxy materials. Such wax-like additives are conventionally used in printing inks to improve the working properties of the inks, to eliminate picking of the stock being printed, to reduce ink tack, to prevent set off, mottle, crystallization and skinning, to impart enhanced scuff resistance and to improve rub-resistance.

As mentioned hereinbefore, the inks of the present invention are printed on the stock and the printed stock is then contacted with a peroxide catalyst. Conveniently, this contact may be accomplished by spraying with an ultra-fine spraying. The peroxide catalyst is advantageously dissolved in a solvent mixture such as ethyl acetate and hexane. The ethyl acetate can be replaced by low-boiling aromatic hydrocarbons, by ketones or by other esters. Hexane can be replaced by other low-boiling aliphatic hydrocarbons and/or halogentated hydrocarbons. When the catalyst contacts the ink deposit, immediately, e.g., within about 1 to about 5 seconds, the surface of the ink deposit becomes hard. Within a few more minutes the ink sets throughout its thickness. The surface hardened ink can be overprinted and is rub- and set off-resistant almost immediately. While the inks of the present invention are shelf stable and may in the usual case be kept up to about 6 months in storage, it is advisable both during manufacture and storage to avoid heating the inks or the varnishes on which they are based in order to minimize chances of premature polymerization.

While the present invention has been described in conjunction with preferred embodiments, modifications and variations may be resorted to as those skilled in the art will recognize. Such modifications and variations are considered to be within the purview and scope of the invention.

We claim:

1. A printing ink adapted to be substantially instantaneously hardened upon contact with a free-radical-generating catalyst comprising, in weight percent,
   A. about 65 percent to about 80 percent of a varnish having a major proportion of a high boiling point monomer liquid at room temperature and a minor proportion of a resin compatible with said liquid monomer, said monomer being selected from the group consisting of acrylic and methacrylic diesters and triesters having a polymerization potential of less than about 20 seconds at temperatures up to about 80° C.,
   B. about 10 percent to about 30 percent pigment,
   C. about 0.5 percent to about 5 percent of a tertiary aromatic amine as an accelerator, and
   D. about 1 percent to about 10 percent of a wax additive.

2. A printing ink as in claim 1 wherein the monomer has a polymerization potential of up to about 5 seconds at 25° C.

3. A printing ink as in claim 2 wherein the monomer comprises a mixture of trimethylolpropane trimethacrylate and diethylene glycol diacrylate in approximately the proportion of 5 to 4 by weight.

* * * * *